(12) United States Patent
Zhao

(10) Patent No.: US 9,970,640 B2
(45) Date of Patent: May 15, 2018

(54) LED FLUORESCENT LAMP DRIVING POWER SOURCE AND LED FLUORESCENT LAMP

(71) Applicant: Yijun Zhao, Shanghai (CN)

(72) Inventor: Yijun Zhao, Shanghai (CN)

( * ) Notice: Subject to any disclaimer, the term of this patent is extended or adjusted under 35 U.S.C. 154(b) by 41 days.

(21) Appl. No.: 14/896,959

(22) PCT Filed: May 28, 2014

(86) PCT No.: PCT/CN2014/078587
§ 371 (c)(1),
(2) Date: Feb. 25, 2016

(87) PCT Pub. No.: WO2014/198182
PCT Pub. Date: Dec. 18, 2014

(65) Prior Publication Data
US 2016/0186969 A1    Jun. 30, 2016

(30) Foreign Application Priority Data

Jun. 9, 2013  (CN) .......................... 2013 1 0230836

(51) Int. Cl.
*F21V 23/00* (2015.01)
*H05B 33/08* (2006.01)
(Continued)

(52) U.S. Cl.
CPC .............. *F21V 23/006* (2013.01); *F21K 9/27* (2016.08); *F21V 15/015* (2013.01);
(Continued)

(58) Field of Classification Search
CPC ........ F21V 23/006; F21V 15/015; F21K 9/27; F21Y 2103/10; F21Y 2115/10;
(Continued)

(56) References Cited

U.S. PATENT DOCUMENTS

| 2003/0155858 A1 | 8/2003 | Cunkelman et al. |
| 2005/0281030 A1 | 12/2005 | Leong et al. |
| 2007/0210687 A1* | 9/2007 | Axelsson ................ F21V 17/04 313/26 |
| 2010/0117559 A1 | 5/2010 | Lee |

(Continued)

FOREIGN PATENT DOCUMENTS

CN  2906322  5/2007

OTHER PUBLICATIONS

Partial Supplementary European Search Report for Application No. 14811685.8 dated Feb. 3, 2017 (7 pages).

*Primary Examiner* — Laura Tso
(74) *Attorney, Agent, or Firm* — Michael Best & Friedrich LLP

(57) ABSTRACT

The invention relates to the technology of semiconductor lighting, and in particular, to a drive power supply for LED incandescent lamp and a LED incandescent lamp comprising the drive power supply. The drive power supply for LED incandescent lamp according to an embodiment of the invention comprises: an end cap, on an outer surface of which is disposed a pair of pins, the pair of pins being hollow and in communication with an interior of the end cap; a base plate located in the end cap, a pair of lead wires are disposed on one of the surfaces of the base plate, and each lead wire is inserted into a corresponding pin respectively and is fixed to an inner wall of the pin; a LED drive circuit module located on the base plate, which is electrically connected to the lead wires.

9 Claims, 11 Drawing Sheets

(51) Int. Cl.
*F21V 15/015* (2006.01)
*F21K 9/27* (2016.01)
*F21Y 103/10* (2016.01)
*F21Y 115/10* (2016.01)

(52) U.S. Cl.
CPC ..... *H05B 33/0812* (2013.01); *H05B 33/0815* (2013.01); *H05B 33/0818* (2013.01); *F21Y 2103/10* (2016.08); *F21Y 2115/10* (2016.08); *Y02B 20/343* (2013.01); *Y02B 20/386* (2013.01)

(58) Field of Classification Search
CPC ............ H05B 33/0812; H05B 33/0815; H05B 33/0818; Y02B 20/343; Y02B 20/286
USPC .......................................... 362/657, 658, 659
See application file for complete search history.

(56) References Cited

U.S. PATENT DOCUMENTS

| | | | |
|---|---|---|---|
| 2010/0201269 A1* | 8/2010 | Tzou | F21V 23/006 315/51 |
| 2011/0117785 A1 | 5/2011 | Takata | |
| 2012/0106157 A1* | 5/2012 | Simon | F21V 25/04 362/249.05 |
| 2012/0147608 A1 | 6/2012 | Kawagoe et al. | |
| 2012/0249012 A1* | 10/2012 | Xu | H05B 33/0815 315/291 |
| 2012/0286678 A1* | 11/2012 | Wu | H05B 33/0815 315/188 |
| 2013/0127338 A1 | 5/2013 | Cheng-Ming et al. | |

\* cited by examiner

LED FLUORESCENT LAMP DRIVING POWER SOURCE AND LED FLUORESCENT LAMP

BACKGROUND

The invention relates to the technology of semiconductor lighting, and in particular, to a drive power supply for LED incandescent lamp and a LED incandescent lamp comprising the drive power supply.

As a new type of light source, the light emitting diode (LED) has such characteristics of energy saving, environment friendly, long life span, small volume, etc., and is being widely used in various aspects of illumination area. LED is a solid state semiconductor device which can convert electrical energy into visible light, and a basic structure thereof typically comprise a bracket having a lead wire, a semiconductor die provided on the bracket, and a packaging material which seals the die surroundingly (e.g., fluorescence silica gel or epoxy resin). The above semiconductor die comprises a P-N structure, in which when the current flows through, electrons are pushed towards the P area, where the electrons couple with electron holes, and then energy is emitted in the form of photons. The length of light is determined by the material from which the P-N structure is formed.

As compared to conventional incandescent lamps, the LED incandescent lamp has many advantages such as high optical-electrical conversion efficiency, constant light source brightness, being non-stroboscopic and harmful heavy metals free, etc. A typical LED incandescent lamp tube is composed of a tube body, an end cap, a lamp plate and a drive power supply, wherein the drive power supply can be placed inside the tube body or mounted outside the tube body.

Chinese patent for invention No. 200920134372.8 discloses an incandescent lamp in which the LED power supply is disposed outside. The incandescent lamp comprises a LED incandescent lamp body, to which an external LED power supply is connected. The LED power supply comprises a PCB circuit board, an input terminal, an output terminal and a power supply box in which the PCB circuit board is disposed, wherein the input terminal is connected to the LED incandescent lamp body via the PCB circuit board and the output terminal. The use of external power supply requires a major modification to the wirings of the incandescent lamp, and the mounting is also inconvenient.

Chinese patent application for invention No. 201110037855.9 discloses a LED incandescent lamp which comprises a lamp tube and end caps installed at both ends of the lamp tube, wherein the lamp tube comprises a lamp plate, a plurality of LEDs arrayed on the lamp plate, and a light output cover casing located above the LEDs. A voltage reducing constant-current source module for providing a constant current to the LED is installed in the end caps, and the positive and negative conductive terminals of the lamp plate are connected to output terminal of the voltage reducing constant-current source module. It is noted that, while the design of the above LED incandescent lamp has completed dispensed with the bounds of original incandescent lamp bases, which is advantageous for optimizing the design of the structure and circuit of the incandescent lamp, the compatibility of it with existing incandescent lamp base is not good.

SUMMARY

An object of the invention is to provide a drive power supply for LED incandescent lamp, which has such advantageous of being compact in structure and being highly compatible with existing incandescent lamp fittings.

The drive power supply for LED incandescent lamp according to an embodiment of the invention comprises:
an end cap, on an outer surface of which is disposed a pair of pins, the pair of pins being hollow and in communication with an interior of the end cap;
a base plate located in the end cap, a pair of lead wires are disposed on one of the surfaces of the base plate, and each lead wire is inserted into a corresponding pin respectively and is fixed to an inner wall of the pin;
a LED drive circuit module located on the base plate, which is electrically connected to the lead wires.

The drive power supply for LED incandescent lamp according to another embodiment of the invention comprises:
a pair of end caps, a pair of pins being disposed on an outer surface of each end cap, the pair of pins being hollow and in communication with an interior of the end caps;
a pair of base plates located in corresponding end caps respectively, a pair of lead wires are disposed on one of the surfaces of each base plate, and each lead wire is inserted into the pin of a corresponding end cap respectively and is fixed to an inner wall of the pin; and
a LED drive circuit module located on the pair of base plates and electrically connected to the lead wires.

In the above embodiments, the LED drive circuit module can be integrated into the end cap of a normal incandescent lamp so that the structure is made more compact and the compatibility with existing incandescent lamps would also be very good.

Preferably, in the above drive power supply for LED incandescent lamp, the base plate further comprises an insertion needle or an insertion slot, which is disposed on another surface opposite to said one of the surfaces of the base plate and is in electrical communication with the LED drive circuit module.

Preferably, in the above drive power supply for LED incandescent lamp, the inner wall of the pin contracts inwardly so as to clamp the lead wire inside it. An existing process of manufacturing existing incandescent lamps can be used for realizing such a lead wire clamping structure, thus facilitating reducing manufacture cost.

Preferably, in the above drive power supply for LED incandescent lamp, the LED drive circuit module comprises:
a bridge rectifying filtering unit;
a DC-DC voltage boosting conversion unit which comprises an inductor, a switch diode, a PWM controller, and a MOS transistor, wherein the inductor and the switch diode are connected in series between the output end of the bridge rectifying filtering unit and the positive output end of the LED drive circuit module, a drain electrode of the MOS transistor is electrically connected between the inductor and the positive electrode of the switch diode, and a gate electrode of the MOS transistor is electrically connected to the output end of the PWM controller; and
a feedback unit comprising a crystal triode, a base electrode of the crystal triode being electrically connected to a negative output end of the LED drive circuit module, and a collector electrode of the crystal triode being electrically connected to a control end of the PWM controller.

Preferably, in the above drive power supply for LED incandescent lamp, the DC/DC converter further comprises a capacitor electrically connected between the control end of the PWM controller and the ground.

Preferably, in the above drive power supply for LED incandescent lamp, the PWM controller and the MOS transistor are integrated in the same one integrated circuit chip.

Preferably, in the above drive power supply for LED incandescent lamp, the PWM controller, the MOS transistor and the crystal triode are integrated in the same one integrated circuit chip.

Preferably, in the above drive power supply for LED incandescent lamp, the LED drive circuit module comprises:

a bridge rectifying filtering unit;

a DC-DC voltage reducing conversion unit which comprises an inductor, a switch diode, a PWM controller, and a MOS transistor, wherein a negative electrode of the switch diode and a positive output end of the LED drive circuit module are commonly connected to an output end of the bridge rectifying filtering unit, a drain electrode of the MOS transistor is electrically connected to the positive electrode of the switch diode, a gate electrode of the MOS transistor is electrically connected to the output end of the PWM controller, and the inductor is electrically connected between the drain electrode of the MOS transistor and the negative output end of the LED drive circuit module.

a feedback unit comprising a resistor, the resistor and a control end of the PWM controller being commonly connected to a source electrode of the MOS transistor.

Preferably, in the above drive power supply for LED incandescent lamp, the LED drive circuit module further comprises a capacitor electrically connected between the positive output end and the negative output end.

Preferably, in the above drive power supply for LED incandescent lamp, the PWM controller and the MOS transistor are integrated in the same one integrated circuit chip.

Preferably, in the above drive power supply for LED incandescent lamp, the LED drive circuit module comprises a bridge rectifying filtering unit and a constant current control unit, wherein the constant current control unit comprises an amplifier, a MOS transistor and a first resistor, the positive output end of the bridge rectifying filtering unit is connected to a positive output end of the LED drive circuit module, a source electrode of the MOS transistor is electrically connected to the negative output end of the LED drive circuit module, a drain electrode of the MOS transistor is electrically connected to a first input end of the amplifier and is connected to the ground via the first resistor, and the output end of the amplifier is electrically connected to a gate electrode of the MOS transistor so as to control on and off of the MOS transistor according to a result of comparison between the voltage on the drain electrode and a reference voltage on a second input end of the amplifier.

Preferably, in the above drive power supply for LED incandescent lamp, the constant current control unit further comprises a second resistor electrically connected between the source electrode and the drain electrode of the MOS transistor.

In the above drive power supply for LED incandescent lamp, the second resistor connected between the source electrode and the drain electrode of the MOS transistor can well function to shunt the current, which can effectively reduce a heat emission volume of the MOS transistor, thus increasing the current flowing through the LED load.

Preferably, in the above drive power supply for LED incandescent lamp, the constant current control unit further comprises a reference voltage circuit which is electrically connected to the second input end of the amplifier.

Preferably, in the above drive power supply for LED incandescent lamp, the amplifier, the MOS transistor and the reference voltage circuit are integrated in the same one integrated circuit chip.

Preferably, the above drive power supply for LED incandescent lamp further comprises a filtering capacitor electrically connected between the positive output end and the negative output end of the bridge rectifying filtering unit.

Another object of the invention is to provide a LED incandescent lamp which has such advantageous of being compact in structure and being highly compatible with existing incandescent lamp fittings.

The LED incandescent lamp according to another embodiment of the invention comprises:

a tube body;

a light source plate located inside the tube body and having a plurality of LED units arranged thereon;

a pair of end caps enclosing both ends of the tube body, a pair of pins being disposed on an outer surface of each end cap, the pair of pins being hollow and in communication with an interior of the end cap;

a pair of base plates located in corresponding end caps respectively fixed together with the light source plate, a pair of lead wires are disposed on one of the surfaces of each base plate, and each lead wire is inserted into the pin of a corresponding end cap respectively and is fixed to an inner wall of the pin; and a LED drive circuit module located on the pair of base plates and electrically connected to the lead wires of one of the base plates.

Preferably, in the above LED incandescent lamp, the light source plate and the base plates are aluminum-based plates or double side printed circuit boards.

Preferably, in the above LED incandescent lamp, the LED units are coupled in series, in parallel or in a combination thereof.

BRIEF DESCRIPTION OF THE DRAWINGS

The above and/or other aspects and advantages of the invention will become more apparent and more easily understood from the description below with reference to the accompanying drawings, in which identical or similar elements are denoted by identical reference signs.

DETAILED DESCRIPTION

Figure 1:
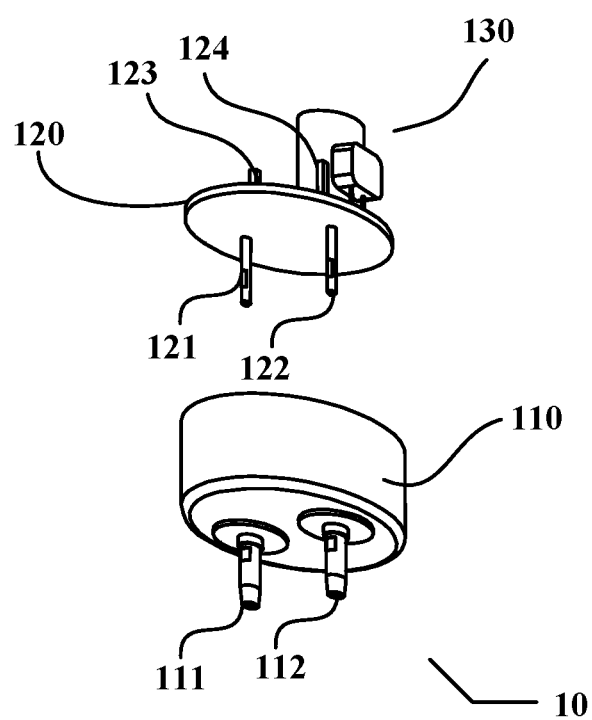
FIG. 1 is an exploded schematic view of a drive power supply for LED incandescent lamp according to an embodiment of the invention.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

In the disclosure herein, unless explicitly stated, the term "semiconductor wafer" refers to a plurality of independent circuits formed on semiconductor material such as Si and GaAs, "semiconductor die" or "die" refer to one of the independent circuits, and "packaged chip" refers to a physical structure where the semiconductor die or dice are packaged. In a typical physical structure, the semiconductor die or dice are, for example, arranged on a frame and then packaged with encapsulating material. The term "light emitting diode unit" refers to a unit containing electroluminescence material. Examples of such a unit include and are not limited to P-N junction inorganic semiconductor light emitting diode and organic light emitting diode (OLED and polymer light emitting diode (PLED)).

The P-N junction inorganic semiconductor light-emitting diode may be taken in a wide range of structure, for example, including light-emitting diode die and light-emitting diode device. The term "light-emitting diode die" refers to a semiconductor die having a P-N junction and achieving electroluminescence, and the term "light-emitting diode device" refers to a physical structure formed by packaging the LED die or dice. In a typical physical structure, the LED die or dice are, for example, arranged on a frame and then packaged with encapsulating material.

The term "wiring", "wiring pattern" and "wiring layer" refer to conductive pattern arranged on or in isolating material and used for providing electrical connection between components, including but not limited to trace and hole such as pad, component hole, fastening hole and metalized hole.

It should be noted that, as used herein, the terms "electrically connected", "electrically connecting", "coupling" and "coupled" include a direction transmission of electrical energy or signal between two elements (no intermediate materials or elements therebetween that electrically connect the two elements together), or an indirection transmission of electrical energy or signal between two elements via one or more other elements.

The term "driving power supply" or "LED driving power supply" refer to an electronic controlling apparatus connected between an external DC or AC power supply and LED as light sources, which supplies current or voltage as required by LED, e.g., constant current, constant voltage or constant power. In specific embodiments, the driving power supply may have a modular structure, e.g., comprising a printed circuit board and one or more devices arranged thereon and electrically connected together by means of wire. The examples of the devices include but are not limited to LED driving controller chip, rectifying chip, resistor, capacitor, diode, transistor and coils.

The terms such as "including" and "comprising" and variations thereof, as used herein, mean that it not only includes the units and steps that are described directly and explicitly, but also includes other units and steps that have not been described directly or explicitly.

The terms such as "first", "second", "third" and "fourth" are merely intended for distinguishing between individual units or values, not for representing their order in terms of time, space or amount.

Expressions such as "object A is disposed on a surface of object B" should be broadly interpreted as object A being disposed directly on a surface of object B or object A being disposed on a surface of another object that is in contact with object B.

The embodiment of the invention will be described below with reference to the drawings.

FIG. 1 is an exploded schematic view of a drive power supply for LED incandescent lamp according to an embodiment of the invention.

As shown in FIG. 1, the drive power supply 10 for LED incandescent lamp according to the present embodiment comprises an end cap 110, a base plate 120 and a LED drive circuit module 130.

The end cap 110 can be of the same pattern and specification as a normal incandescent lamp end cap or plug. Specifically, a pair of pins 111 and 112 are disposed on an outer surface of the end cap 110 by means of rivet fixation, for example. The pair of pins can serve as electrical interfaces between a lamp base and the drive power supply for LED incandescent lamp. In the present embodiment, the pins 111 and 112 are hollow and in communication with an interior space of the end cap 110.

In the assembled drive power supply 10 for LED incandescent lamp, the base plate is located inside the end cap 110. For example, by using the process of manufacturing a normal incandescent lamp, the base plate 120 can be also fixed inside the end cap 110 at the same time of enclosing both ends of the incandescent lamp tube body by the end cap 110 with the aid of adhesives such as light mud. As shown in FIG. 1, a pair of lead wires 121 and 122 are disposed on a lower surface of the base plate 120. The pair of lead wires serve as an input end of the LED drive circuit module 130, and are inserted into corresponding pins 111 and 112 respectively. The inner walls of the pins 111 and 112 contract inwardly so as to clamp the lead wires 121 and 122, and in this way, a fixation and electrical connection between the lead wires and the pins are realized. For this purpose, by using an existing device for manufacturing incandescent lamp, after the lead wires are inserted into corresponding pins, the outer surfaces of the pins are pressed so that the inner walls contract. In the present embodiment, the lead wires can be hard lead wires or soft lead wires.

Figure 2A:
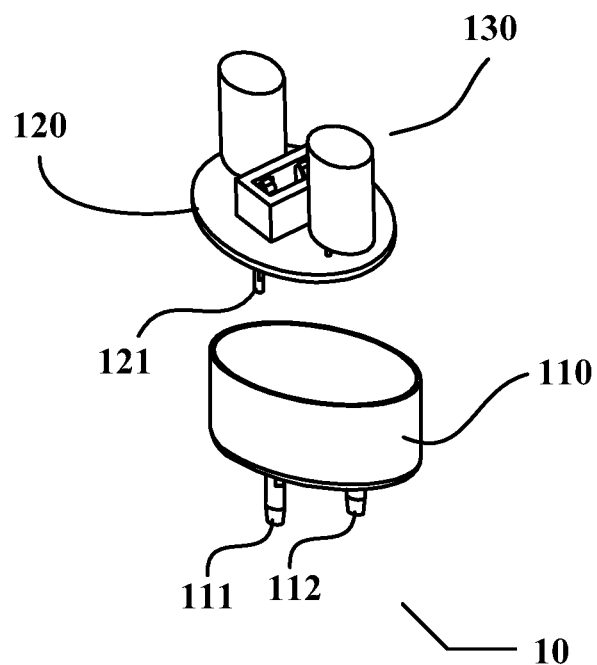
FIG. 2A is an exploded schematic view of a variation of the drive power supply for LED incandescent lamp shown in FIG. 1.
Figure 2B:
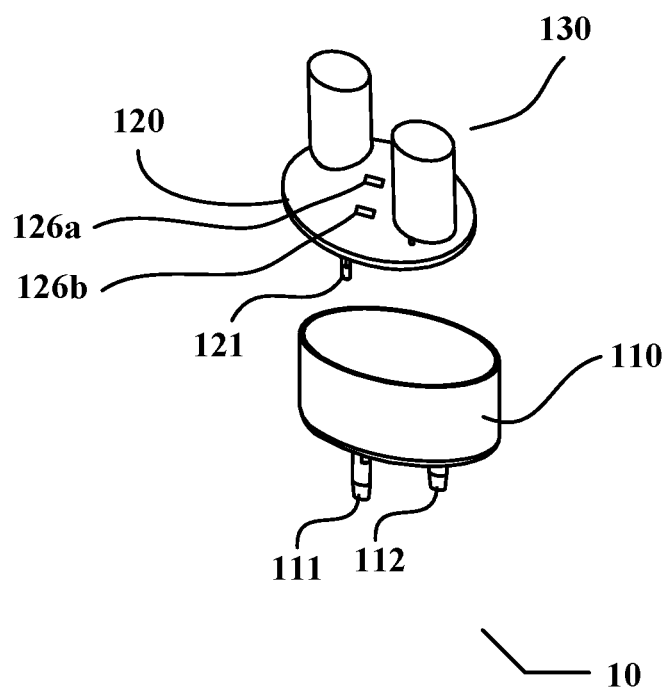
FIG. 2B is an exploded schematic view of a variation of the drive power supply for LED incandescent lamp shown in FIG. 1.

With reference to FIG. 1, a pair of insertion needles 123 and 124 are disposed on an upper surface of the base plate 120. The pair of insertion needles serve as an output end of the LED drive circuit module 130, and are adapted to be electrically connected to LED units of the LED incandescent lamp. Alternatively, as shown in FIG. 2A, an insertion slot can be also disposed on the upper surface of the base plate 120 to replace the insertion needles in FIG. 1. Alternatively, the output end of the LED drive circuit module 130 can be also in the form of passage holes. For example, a pair of passage holes 126a and 126b are formed in the base plate 120, as shown in FIG. 2B.

As shown in FIG. 1, the LED drive circuit module 130 is disposed on the upper surface of the base plate 120, and comprises various elements as well as wirings for realizing electrical connection among the elements. In the present embodiment, the input end of the LED drive circuit module 130 is in the form of lead wires, and the output end is in the form of insertion needles. The circuit principle of the LED drive circuit module 130 will be described later in detail.

Figure 3:
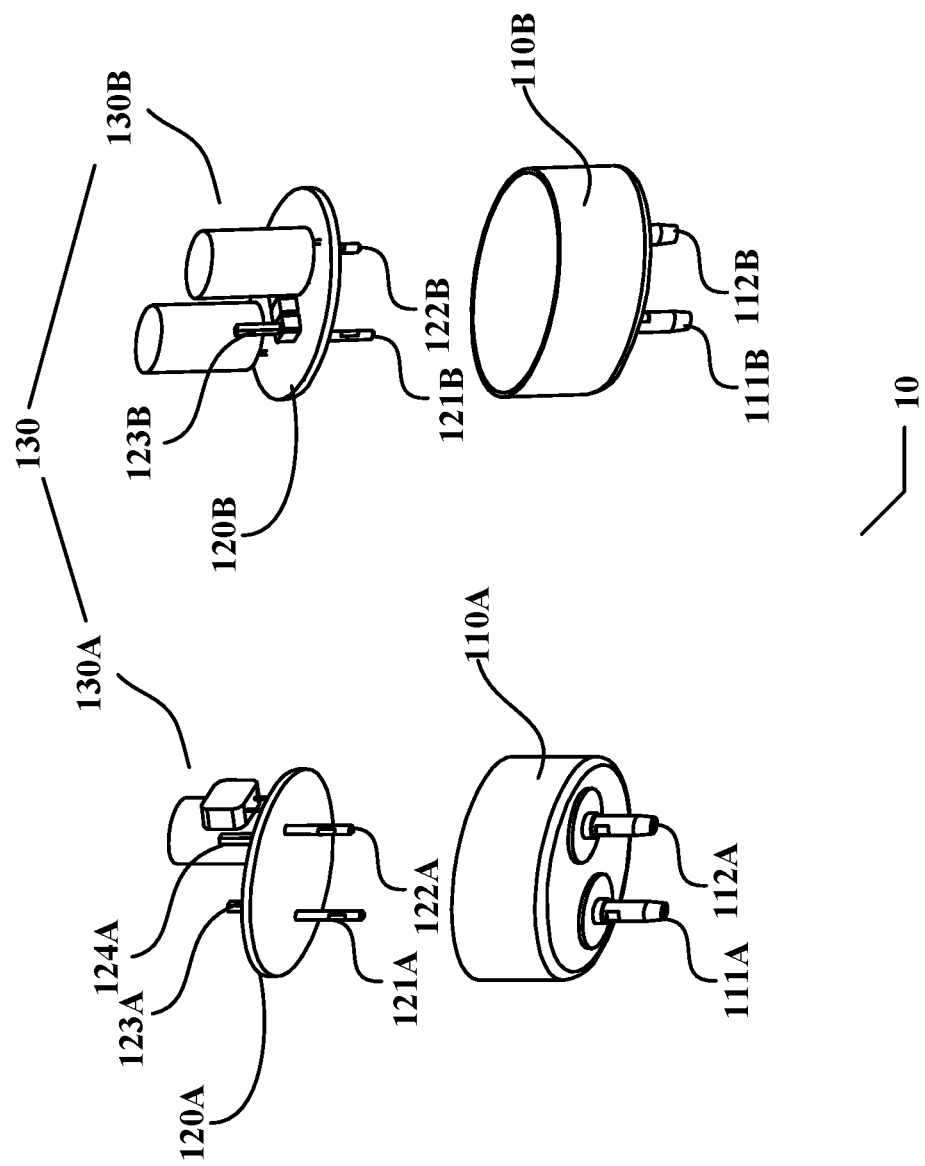
FIG. 3 is an exploded schematic view of a drive power supply for LED incandescent lamp according to another embodiment of the invention.

FIG. 3 is an exploded schematic view of a drive power supply for LED incandescent lamp according to another embodiment of the invention.

In the embodiment shown in FIG. 1, the LED drive circuit module is disposed on one base plate. Unlike this layout, in the embodiment shown in FIG. 3, the elements of the LED drive circuit module are dispersedly disposed on two base plates, and a further description will be given below.

As shown in FIG. 3, the drive power supply 10 for LED incandescent lamp according to the present embodiment comprises a pair of end caps 110A and 110B, a pair of base plates 120A and 120B, and a LED drive circuit module 130, wherein a first portion 130A (e.g., a bridge rectifying filtering unit) and a second portion 130B (e.g., a DC-DC converting circuit and a feedback circuit, etc.) of the LED drive circuit module 130 are disposed on base plates 120A and 120B respectively. Preferably, an electrical connection between the first portion 130A and the second portion 130B can be realized by means of electrical connection components (e.g., connection lead wires or wirings formed on the light source plate) located outside the LED drive power supply when assembling the incandescent lamp.

A pair of pins 111A and 112A are disposed on an outer surface of the end cap 110A so as to provide electrical interfaces between the light base and the drive power supply for LED incandescent lamp. The pins 111A and 112A can be also hollow and in communication with an interior space of the end cap 110A.

In the assembled drive power supply 10 for LED incandescent lamp, the base plate is located inside the end cap 110A. As described above, by using the process of manufacturing a normal incandescent lamp, the base plate 120A can be fixed inside the end cap 110A at the same time of the assembling the incandescent lamp so that process steps are economized. A pair of lead wires 121A, 122A and a pair of insertion needles 123A, 124A are disposed on the lower and upper surfaces of the base plate 120A respectively. The lead wires 121A and 122A can be hard lead wires or soft lead wires, and are inserted into corresponding pins 111A and 112A respectively and are clamped by inner walls of the pins so that a fixation and electrical connection between the lead wires and the pins are realized and that the first portion 130A on the base plate 120A can be electrically connected to an external power supply (e.g., 220V mains supply) via the lead wires 121A, 122A and the pins 111A, 112A. The pins 123A and 124A on the upper surface of the base plate 120A provide electrical connection interfaces with other components (e.g., the second portion 130B) for the first portion 130A of the LED drive circuit module. In the present embodiment, the insertion needles can be also replaced with an insertion slot like that shown in FIG. 2A or passage holes like those shown in FIG. 2B.

For the end cap 110B and the base plate 120B provided therein, they have structures and features substantially identical or similar to those of the end cap 110A and the base plate 120A. Therefore, the description will herein focus on the differences. Specifically, the leads wires 121B and 122B disposed on the base plate 120B are inserted into corresponding pins 111B and 112B respectively and are clamped by the inner walls of the pins. However, the leads wires 121B and 122B are not connected to a second portion 130B of the LED drive circuit module. Preferably, the leads wires 121B and 122B can be shorted so that the pins 111B and 112B are connected directly so as to facilitate installation of the LED incandescent lamp. In addition, four insertion needles are disposed on the base plate 120B, two of which can be electrically connected to the insertion needles 123A and 124A on the base plate 120A via wirings on the light source plate, and the other two of which serve as the output end of the LED drive circuit module 130 so as to be electrically connected to the LED units on the light source plate. Due to the reason of perspectives of view, FIG. 3 merely shows the insertion needle 123B electrically connected to the insertion needle 123A. Similarly, the insertion needles herein can be also replaced with insertion slot or passage holes.

It is worth noting that, while in the above embodiment shown in FIGS. 1 to 3, the LED drive circuit module is disposed only on one surface of the base plate, alternatively, it can be disposed on both the upper and lower surfaces of the base plate.

Figure 4:
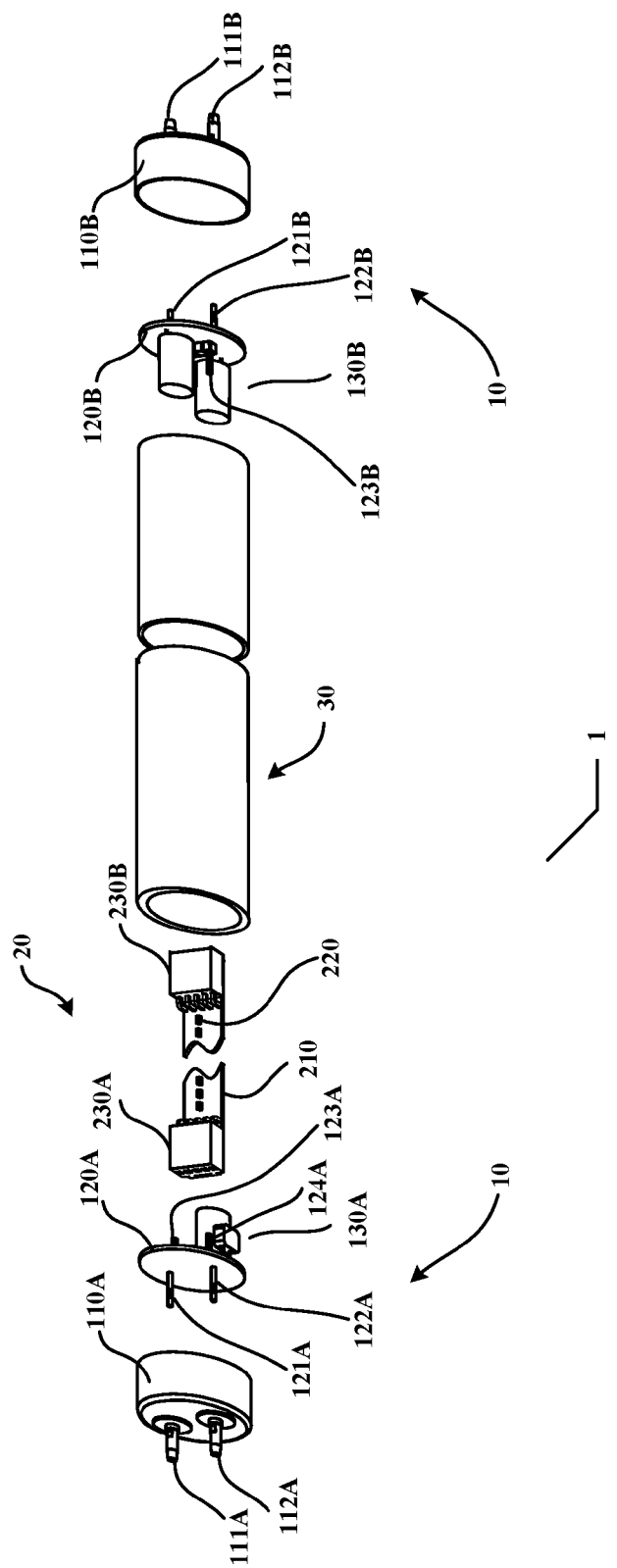
FIG. 4 is an exploded schematic view of a LED incandescent lamp according to another embodiment of the invention.

FIG. 4 is an exploded schematic view of a LED incandescent lamp according to another embodiment of the invention.

The LED incandescent lamp 1 shown in FIG. 4 comprises a LED drive power supply 10, a light source module 20 and a tube body 30. For the purpose of convenience, the light source plate of the light source module and an intermediate portion of the tube body are not shown in FIG. 4. However, such an omission will not adversely impair the understanding of the text portion.

The LED drive power supply 10 can use the structures and features shown above in FIG. 3, and is disposed at both ends of the tube body 30. The light source module 20 comprises a light source plate 210 located inside the tube body 30, LED units 220 disposed on the light source plate, and sockets 230A and 230B disposed at both ends of the light source plate, wherein a plurality of LED units on the light source plate 210 can be connected together in series, in parallel, in a combination thereof or in a crossed array, etc.

In addition, it should be understood that FIG. 4 shows a schematic view in an exploded state. When the assembly of LED incandescent lamp 1 is completed, the end caps 110A and 110B of the LED drive power supply 10 enclose both ends of the tube body 30. In the present embodiment, inner surfaces of the end caps 110A and 110B and the outer surface of the tube body 30 can be adhered together by using adhesives (e.g., light mud), and meanwhile, the base plate can be also fixed to inside the end caps.

When the assembly of LED incandescent lamp 1 is completed, the base plates 120A, 120B and the light source plate 210 can be fixed together by means of the illustrated insertion needles and sockets so that an electrical connection between the LED drive circuit module and the LED units is realized. In the meantime, suitable wirings (not shown) are also formed on the light source plate 210 so as to realize an electrical connection between the first portion 130A and the second portion 130B of the LED drive circuit module that are located on different base plates. Similar to the embodiment shown in FIG. 3, four insertion needles are disposed on the base plate 120B, two of which are electrically connected to the insertion needles 123A and 124A on the base plate 120A via wirings on the light source plate, and the other two of which serve as the output end of the LED drive circuit module 130 so as to be electrically connected to the LED units 220. Due to the reason of perspectives of view, FIG. 4 also merely shows the insertion needle 123B electrically connected to the insertion needle 123A.

Figure 5:
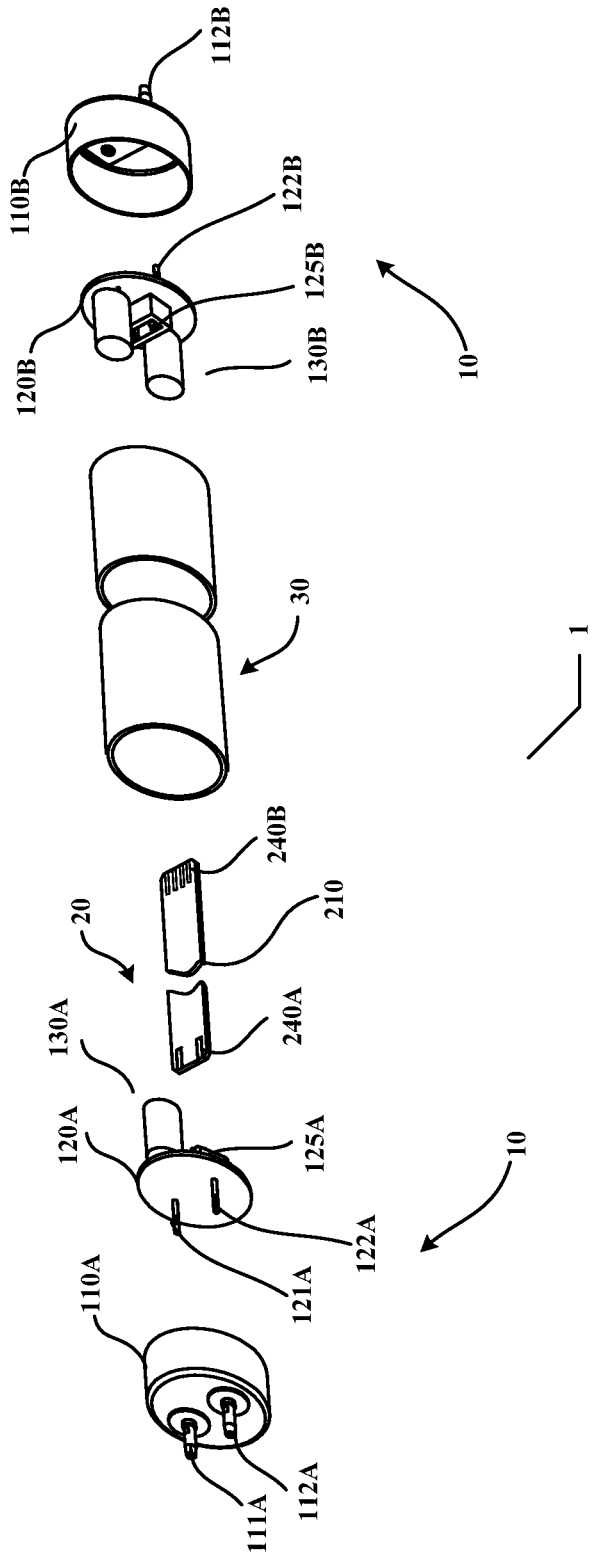
FIG. 5 is an exploded schematic view of a variation of the LED incandescent lamp shown in FIG. 4.

Alternatively, the base plates of the LED drive power supply 10 and the light source plate of the light source module 20 can be also connected in a snap fit. FIG. 5 is an exploded schematic view of a variation of the LED incandescent lamp shown in FIG. 4, and shows the above snap fit connection. For the purpose of convenience, the light source plate of the light source module and an intermediate portion of the tube body are not shown in FIG. 5. However, such an omission will not adversely impair the understanding of the text portion. As shown in FIG. 5, insertion slots 125A and 125B are disposed on the base plates 120A and 120B respectively, and in the meantime, wirings 240A and 240B are formed on both ends of the light source plate 210 respectively. When the two ends of the light source plate 210 are inserted into the insertion slots 125A and 125B, on one hand, the light source plate and the base plates 120A and 120B can be fixed together, and on the other hand, the LED drive circuit module on the base plate can be electrically connected to LED units, and the first portion 130A and the second portion 130B of the LED drive circuit module that are located on different base plates can be electrically connected together via suitable wirings (not shown) formed on the light source plate. Specifically, as shown in FIG. 5, the wiring 240B comprise four finger-like branches, two of which are electrically connected to two branches on the wiring 240A via wirings on the light source plate, and the other two of which serve as the output end of the LED drive circuit module 130 so as to be electrically connected with LED units 220.

In addition, alternatively, the base plates of the LED drive power supply 10 and the light source plate of the light source module 20 can be also fixed together through the passage holes shown in FIG. 2B. Specifically, passage holes are formed on the base plates 120A and 120B, and finger-like protrusions that mate with the passage holes are formed on both ends of the light source plate 210. By welding the finger-like protrusions into the passage holes, the base plates and the light source plate can be fixed together.

In the present embodiment, the tube body 30 can be made from glass or plastics. In order to avoid a dazzling effect, at least one of the inner and outer surfaces of the tube body made from glass can be subject to a grinding process (e.g., using an acid solution to roughen the inner tube surface). Alternatively, light diffusing powder can be also coated onto the inner surface of the tube body 30.

Figure 6:
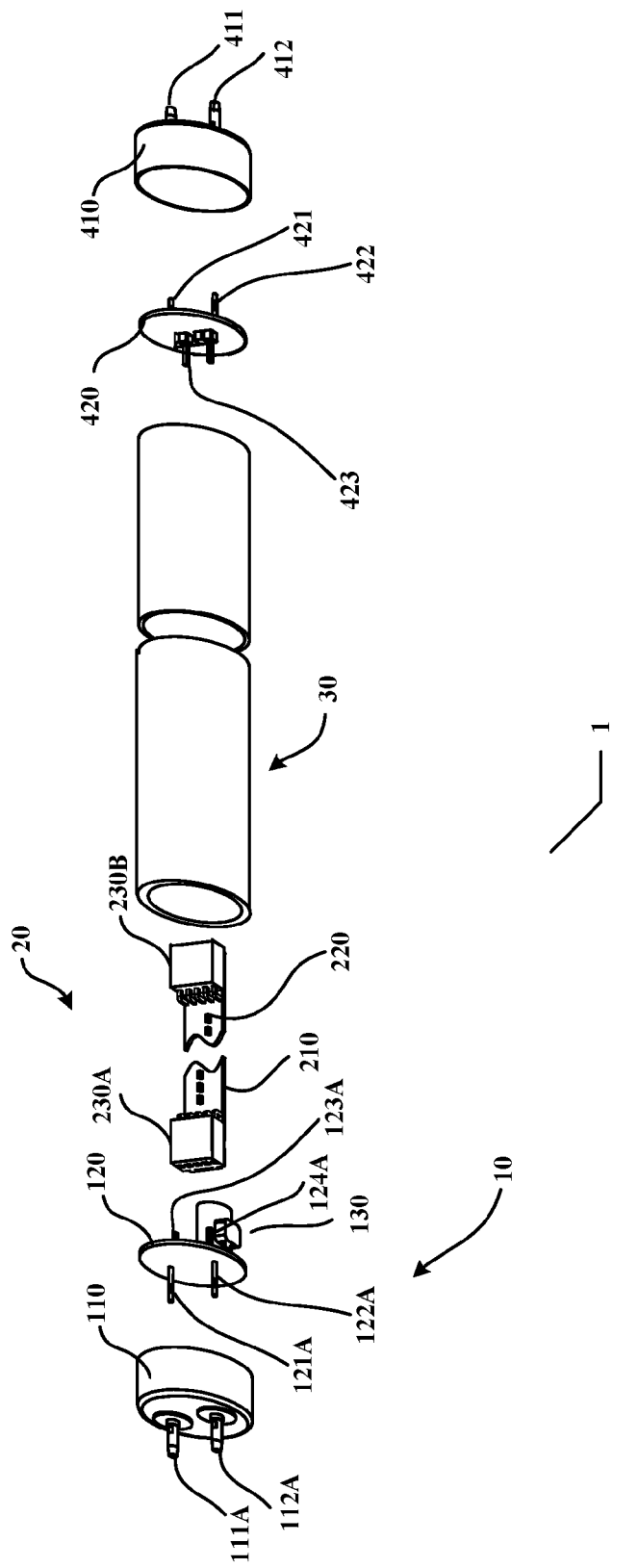
FIG. 6 is an exploded schematic view of a LED incandescent lamp according to another embodiment of the invention.

FIG. 6 is an exploded schematic view of a LED incandescent lamp according to another embodiment of the invention.

Unlike the embodiments shown in FIGS. 4 and 5, in the present embodiment, the LED drive circuit module of the LED drive power supply is disposed on one base plate, and accordingly, the LED drive power supply is located on one end of the tube body. In order to avoid repeated description, the differences of the present embodiment from the previous embodiments will be mainly discussed.

The LED incandescent lamp 1 according to the embodiment shown in FIG. 6 comprises a LED drive power supply 10, a light source module 20 and a tube body 30. For the purpose of convenience, the light source plate of the light source module and an intermediate portion of the tube body are not shown in FIG. 6. However, such an omission will not adversely impair the understanding of the text portion.

The LED drive power supply 10 can use the structures and features shown above in FIG. 1, and is disposed at one end of the tube body 30. The light source module 20 uses the same structures and features as those of the embodiment shown in FIG. 4, and can also use the structures and features of embodiment shown in FIG. 5.

When the assembly of LED incandescent lamp 1 is completed, the end cap 110 of the LED drive power supply 10 encloses one end of the tube body 30, and the base plate 120 and the light source plate 210 can be fixed together in a snap fit shown in the figure so as to realize an electrical connection between them.

In the present embodiment, the LED incandescent lamp 1 further comprises an end cap 410 and a base plate 420 inside the end cap 410. As shown in FIG. 6, a pair of pins 411 and 412 adapted to be inserted into the incandescent lamp base are provided on an outer surface of the end cap 410. When the assembly of LED incandescent lamp 1 is completed, the other end of the tube body 30 is enclosed by the end cap 410. For example, adhesives (e.g., light mud) can be used to adhere the inner surface of the end cap 410 and the outer surface of the tube body 30 together, and at the same time, the base plate 420 is also fixed inside the end cap 410. A pair of lead wires 421, 422 and a snap slot 423 are disposed on two surfaces of the base plate 420 respectively. In the present embodiment, the pins 411 and 412 are hollow and in communication with an interior space of the end cap 410, and therefore, the lead wires 421 and 422 are inserted into corresponding pins 411 and 412 respectively and are clamped by inner walls of the pins so that a fixation and electrical connection between the lead wires and the pins are realized. When the assembly of LED incandescent lamp 1 is completed, the insertion needles 423A and 423B on the base plate 420 are inserted into the socket 230B on one end of the light source plate 210 so as to fix the light source plate 210 and the base plate 420 together. Preferably, the lead wires 421 and 422 are shorted together so as to realize a direct connection between the pins 411, 412.

Figure 7:
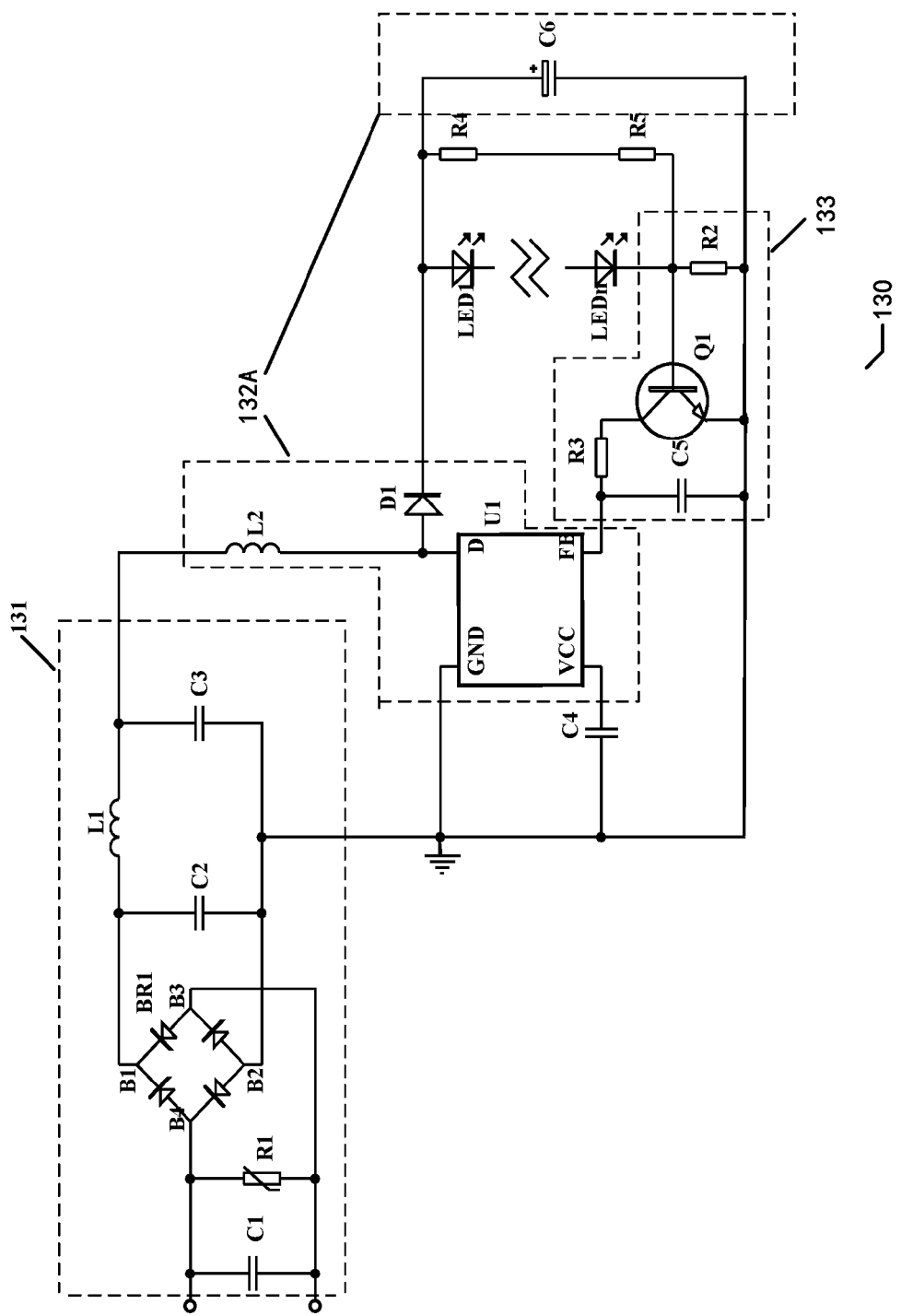
FIG. 7 is a circuit diagram of a LED drive circuit module that can be applied to the embodiment shown in FIGS. 1 to 6.

FIG. 7 is a circuit diagram of a LED drive circuit module that can be applied to the embodiment shown in FIGS. 1 to 6.

The LED drive circuit module 130 shown in FIG. 7 comprises a bridge rectifying filtering unit 131, a DC-DC voltage boost conversion unit 132A and a feedback unit 133, which will be further described below.

As shown in FIG. 7, the bridge rectifying filtering unit 131 comprises a full-bridge rectifier BR1, capacitors C1, C2 and C3, a piezo-resistor R1 and an inductor L1. An alternating current (e.g., mains supply) flows through the full-bridge rectifier BR1 so as to be rectified, and a full wave pulsating voltage is output at a positive electrode terminal B1. The filtering capacitors C1, C2 and C3, the piezo-resistor R1 and the inductor L1 constitute an EMI filtering circuit which, on one hand, suppresses the influence of high-frequency interference in AC grid on a drive circuit, and on the other hand, suppresses electromagnetic interference with AC grid from the drive circuit.

It is worth noting that while a full wave rectifying mode is shown herein, a half wave rectifying mode can be also used. In addition, in order to further simplify the structure of circuit, the piezo-resistor R1, the filtering capacitors C1, C2 and C3, and the inductor L1 in the bridge rectifying filtering unit 131 of the circuit shown in FIG. 7 can be also omitted.

With reference to FIG. 7, the filtering capacitor C1 and the piezo-resistor R1 are connected in parallel between AC input ends B3 and B4 of the full-bridge rectifier BR1, wherein the piezo-resistor R1 controls an input voltage of the full-bridge rectifier BR1 at a predetermined level by suppressing an abnormal over-voltage occurring in the circuit. The filtering capacitors C2, C3 and the inductor L1 constitute a π type filtering circuit and are electrically connected between a positive electrode end B1 and a negative electrode end B2 of the full-bridge rectifier BR1 so as to perform low pass filtering on the pulsating voltage output from the full-bridge rectifier BR1.

The DC-DC voltage boost conversion unit 132A is electrically connected to the bridge rectifying filtering unit 131, the feedback unit 133 and LED loads LED1-LEDn (i.e., the plurality of LED units 220 provided on the light source plate shown in FIGS. 4-6), and servers to boost the pulsating voltage output from the bridge rectifying filtering unit 131 to a required voltage and current level so as to be provided to the LED loads. In addition, the DC-DC voltage boost conversion unit 132A also cooperates with the feedback unit 133 so as to keep the current and voltage provided to the LED loads constant and realize a power factor correcting function. In a typical application, a total voltage after connecting a plurality of LED units in series is designed to exceed a maximum voltage value input form the grid. Therefore, it is required to boost the voltage. Taking a 220V AC voltage with a fluctuating range of ±10% as an example, the maximum voltage is about 342V, and the LED series voltage will exceed 342V.

In the LED drive circuit module shown in FIG. 7, the DC-DC voltage boost conversion unit 132A comprises an inductor L1, a switch diode D1, a capacitor C6 and a switching regulatorU1.

Preferably, an integrated circuit chip integrated with a pulse width modulation (PWM) controller and metal-oxide-semiconductor field-effect transistor (hereinafter referred to as MOS transistor for short) can be used an the switching regulatorU1, wherein an output end of the PWM controller is electrically connected with a gate electrode of the MOS transistor so as to control on and off of the MOS transistor. In a specific switching regulatorchip, in order to simplify adjustment of duty cycle, the switch frequency of the MOS transistor can be kept at a fixed value (e.g., about 1 MHz), and the off time of the MOS transistor is adjustable; alternatively, the off time of the MOS transistor is kept at a fixed value (e.g., about 320 ns), and the switch frequency of the MOS is adjustable. Typically, such a switching regulatorchip is generally configured with a drain electrode pin electrically connected with a drain electrode of the MOS transistor, and a feedback pin electrically connected with a control end of the PWM controller. The examples of the above switching regulator include but are not limited to IC chip CW12L30 and CW12L40, which are available from Shanghai Chipswinner electronics Ltd., China.

As shown in FIG. 7, the inductor L2 and the switch diode D1 are connected in series between the output end of the bridge rectifying filtering unit 131 and a positive electrode input end of LED load or a positive electrode output end of the LED drive circuit module, wherein a positive electrode of the switch diode D1 is electrically connected with the inductor L2, and a negative electrode of the switch diode D1 is electrically connected with the positive electrode input end of LED load. Preferably, a Schottky diode having a fast speed and low voltage reduction can be used as the switch diode D1. With continued reference to FIG. 7, a drain electrode pin D of the switching regulatorU1 is electrically connected between the inductor L2 and the positive electrode of the switch diode D1, and the feedback pin FB is electrically connected with the feedback unit 133. In addition, in the circuit shown in FIG. 7, the capacitor C6 and the positive electrode input end of the LED load are commonly connected to the negative electrode of the switch diode D1 so as to discharge to the LED load when the switch diode D1 cuts off.

With reference to FIG. 7, the switching regulatorU1 further comprises a power supply pin VCC and a grounded pin GND, wherein the power supply pin VCC is grounded via the capacitor C4.

The feedback unit 133 comprises a crystal triode Q1, resistors R2, R3 and a capacitor C5. As shown in FIG. 7, the crystal triode Q1 uses a connection mode of common emitter amplifying circuit, wherein the common emitter is electrically connected to the feedback pin of the switching regulatorU1 via the resistor R3 so as to provide a feedback signal to the switching regulatorU1, the emitter electrode thereof is electrically connected to the ground to serve as a common grounded terminal of an input circuit and an output circuit, and the base electrode thereof is connected to the circuit of the LED load by being electrically connected to the negative electrode of the LED load so as to extract detection signal. The resistor R2 is electrically connected between the base electrode and the ground so as to constitute the input circuit. In addition, the feedback pin FB of the switching regulatorU1 is also grounded via the capacitor C5.

The operational principle of the LED drive circuit module 130 shown in FIG. 7 will be described below.

When the AC power supply is turned on, the bridge rectifying filtering unit 131 converts the input AC into a pulsating voltage and outputs it to the inductor L2 of the DC-DC voltage boost conversion unit 132A. The MOS transistor inside the switching regulatorU1 is turned on or off at a very high frequency under the control of PWM controller signal.

When the MOS is turned on, under the action of the output voltage of the bridge rectifying filtering unit 131, the current flows through the inductor L2 and the MOS transistor, and the switch diode D1 will cut off due to the voltage on the capacitor C6. With the continuous increase of the current flowing through the inductor L2, more and more energy are stored in the inductor. At this time, the LED loads are supplied power by the capacitor C6 and operate on the basis of the discharged current of the capacitor C6.

When the MOS transistor is switched to an off state, the current flowing through the inductor L2 starts to decrease, thus inducing inductive electromotive force at two ends of the inductor L2, wherein the polarity is positive at the upper and negative at the right. The inductive electromotive force is superposed onto the output voltage of the bridge rectifying filtering unit 131, after which the output voltage of the bridge rectifying filtering unit 131 is increased. At this time, the superposed voltage is higher than the voltage on the capacitor C6, and therefore the switch diode D1 turns into an on state. The LED loads are instead supplied power by the inductor L2, and the capacitor C6 is also charged by the inductor L2 until the MOS switches into an ON state again. In the present embodiment, the magnitude of the inductive electromotive force is dependent on the duty cycle of the MOS transistor, and therefore a desired voltage boost range can be obtained by adjusting the duty cycle of the output signal of the PWM controller.

When the MOS transistor is once again switched back to the ON state, the superposed voltage on the switch diode D1 begins to decrease and will once again become lower than the voltage on the capacitor C6. Therefore, the switch diode D1 turns into the cut off state, and the LED loads are instead supplies power by the capacitor C6 at a boosted voltage, while the inductor L2 begins to store electrical energy again.

As can be seen from the above, under the control of the PWM controller, the MOS transistor switches between the above on and off states frequently so that the voltage on the positive electrode of the LED load is always kept at a higher voltage level.

With reference to FIG. 7, the LED loads and the resistors R4, R5 are connected in parallel between the negative electrode of the switch diode D1 and the resistor R2, and the negative electrodes of the LED loads are electrically connected a base electrode of the crystal triode Q1. When the current flowing through the LED loads or the voltage on the LED loads fluctuates, the current flowing through the base electrode of the crystal triode Q1 will also change, a feedback signal that is amplified by the crystal triode Q1 is output to the feedback pin of the switching regulatorU1 from the collector electrode via the resistor R3, and the PWM controller can therefore adjust the duty cycle of the output signal according to the feedback signal so that the current and voltage provided to the LED loads are kept constant.

In the circuit shown in FIG. 7, the feedback pin FB of the switching regulatorU1 is also grounded via a capacitor C5 having a large capacity so that the response of the feedback circuit becomes slow and the feedback electrical level is nearly constant during half a cycle of the AC circuit. The substantially constant feedback electrical level means that the current in the MOS transistor corresponds to an average energy transmitted to the LED loads during half a cycle of the AC circuit. Since the switching regulatorU1 operates at a fixed frequency, the increase of current will not exceed a certain range before the on time of the MOS transistor ends. By reducing the on-ff current flowing through the MOS transistor when the input AC voltage increases and increasing the on-ff current flowing through the MOS transistor when the input AC voltage decreases, the ripper wave of the input end of the LED load is minimized, and the input AC current can always follow the variation of input AC voltage, thus realizing a power factor correcting function.

It is noted that in the circuit shown in FIG. 7, the PWM controller and the MOS transistor are integrated onto the same one integrated circuit chip. In order to further improve integration degree, the crystal triode Q1, the PWM controller and the MOS transistor can be integrated onto the same one integrated circuit chip.

Alternatively, the PWM controller and the MOS transistor can be provided in the LED drive circuit module in the form of separate circuit elements. The LED drive circuit module shown in FIG. 8 is an example of such a form, wherein elements identical or similar to those shown in FIG. 7 are denoted by identical reference signs.

Figure 8:
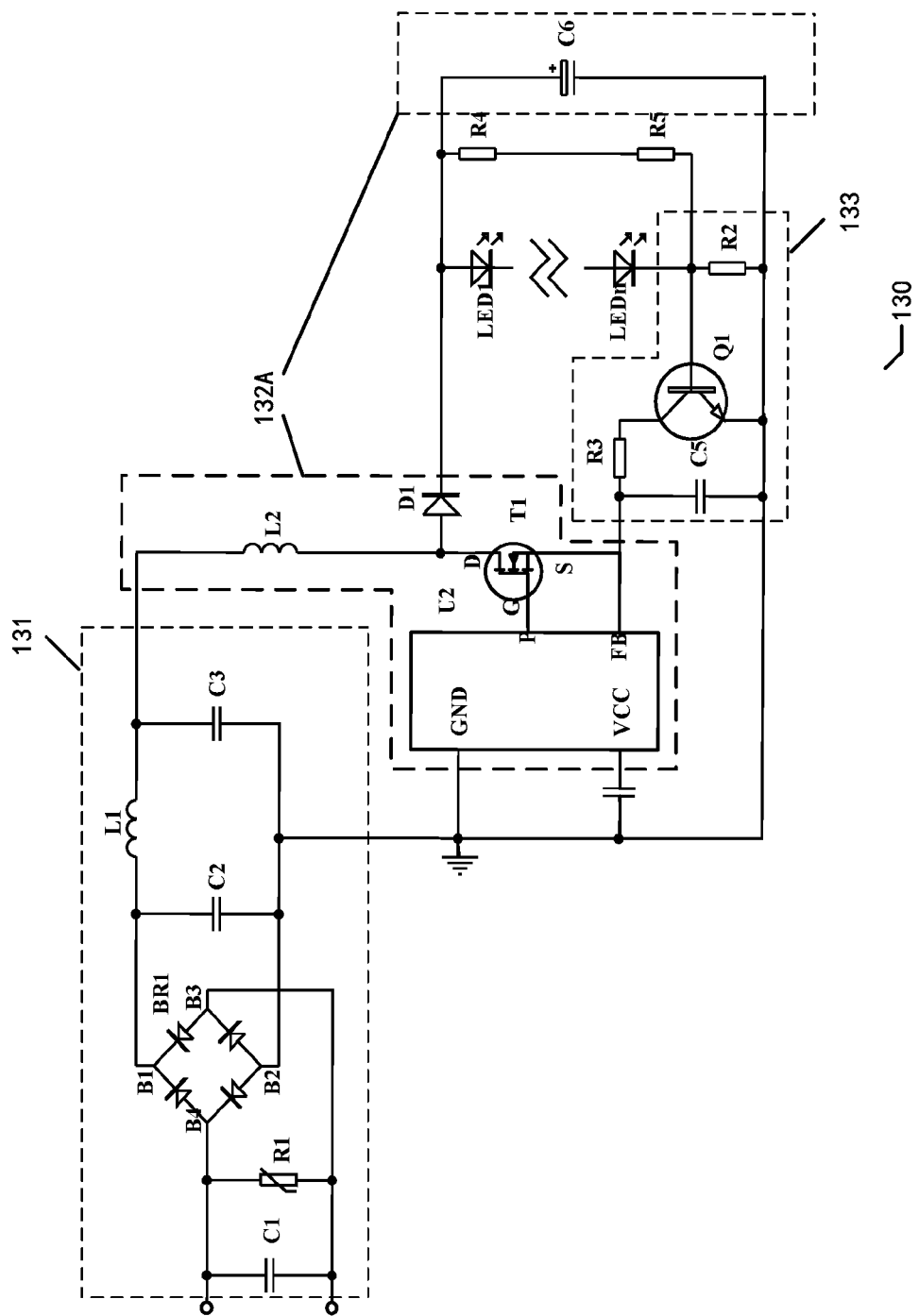
FIG. 8 is a circuit diagram of a variation of a LED drive circuit module shown in FIG. 7.

The drive circuit module 130 shown in FIG. 8 also comprises a bridge rectifying filtering unit 131, a DC-DC voltage boost conversion unit 132A and a feedback unit 133. The forms and structures of the bridge rectifying filtering unit 131 and the feedback unit 133 are the same as those shown in FIG. 7, and a repeated discussion is not given herein.

With reference to FIG. 8, the DC-DC voltage boost conversion unit 132A comprises an inductor L2, a switch diode D1, a capacitor C6, a PWM controller U2 and a MOS transistor T, wherein the inductor L2 and the switch diode D1 are connected in series between the output end of the bridge rectifying filtering unit 131 and the positive electrode input end of the LED load or the positive electrode output end of the LED drive module, the positive electrode of the switch diode D1 is electrically connected to the inductor L2, and the negative electrode of the switch diode D1 is electrically connected to the LED load. In the present embodiment, a drain electrode D of the MOS transistor T is electrically connected between the inductor L2 and the positive electrode of the switch diode D1, the source electrode S is electrically connected to the ground, and the gate electrode G is connected to the output end P of the PWM controller U2. The PWM controller U2 is typically provided in the form of integrated circuit chip, and the control end FB thereof is electrically connected to the feedback unit 133. As shown in FIG. 8, the capacitor C6 is electrically connected between the negative electrode of the switch diode D1 and the LED load so as to discharge to the LED load when the switch diode D1 cuts off.

The feedback unit 133 also comprises a crystal triode Q1, resistors R2, R3 and a capacitor C5. The crystal triode Q1 uses a connection mode of common emitter amplifying circuit, wherein the common emitter is electrically connected to the control end FB of the PWM controller U2 via the resistor R3 so as to provide a feedback signal to the PWM controller U2, the emitter electrode thereof is electrically connected to the ground to serve as a common grounded terminal of an input circuit and an output circuit, and the base electrode thereof is connected to the circuit of the LED load so as to extract detection signal. The control end FB of the PWM controller is also grounded via the capacitor C5.

The operational principle of the LED drive circuit module shown in FIG. 8 is similar to that shown in FIG. 7, and therefore a repeated discussion is omitted herein.

Figure 9:
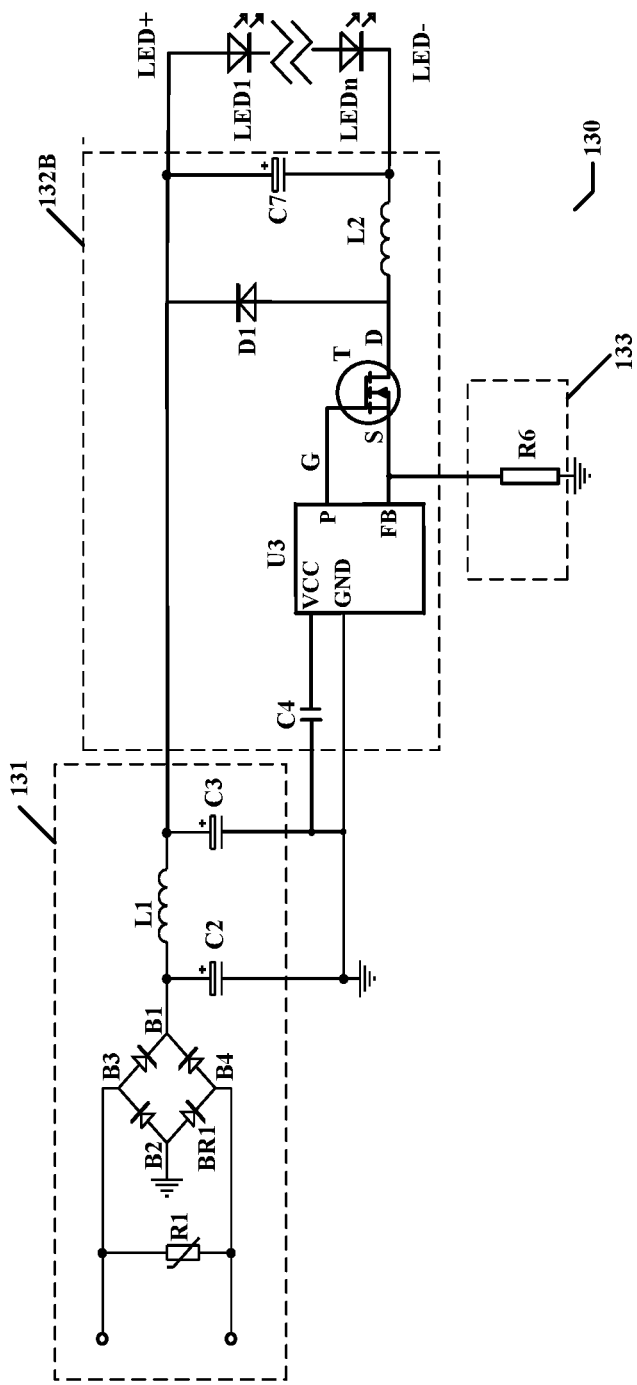
FIG. 9 is a circuit diagram of another LED drive circuit module that can be applied to the embodiment shown in FIGS. 1 to 6.

FIG. 9 is a circuit diagram of another LED drive circuit module that can be applied to the embodiment shown in FIGS. 1 to 6.

The LED drive circuit module 130 shown in FIG. 9 comprises a bridge rectifying filtering unit 131, a DC-DC voltage reducing conversion unit 132B and a feedback unit 133, which will be further described below.

As shown in FIG. 9, the bridge rectifying filtering unit 131 comprises a full-bridge rectifier BR1, capacitors C2, C3, a piezo-resistor R1 and an inductor L1. An alternating current (e.g., mains supply) flows through the full-bridge rectifier BR1 so as to be rectified, and a full wave pulsating voltage is output at a positive electrode terminal B1. The filtering capacitors C2, C3, the piezo-resistor R1 and the inductor L1 constitute an EMI filtering circuit which, on one hand, suppresses the influence of high-frequency interference in AC grid on a drive circuit, and on the other hand, suppresses electromagnetic interference with AC grid from the drive circuit.

With reference to FIG. 9, the piezo-resistor R1 is connected in parallel between AC input ends B3 and B4 of the full-bridge rectifier BR1, wherein the piezo-resistor R1 controls an input voltage of the full-bridge rectifier BR1 at a predetermined level by suppressing an abnormal overvoltage occurring in the circuit. The filtering capacitors C2, C3 and the inductor L1 constitute a π type filtering circuit and are electrically connected between a positive electrode end B1 and a grounded negative electrode end B2 of the full-bridge rectifier BR1 so as to perform low pass filtering on the pulsating voltage output from the full-bridge rectifier BR1.

It is worth noting that while a full wave rectifying mode is shown herein, a half wave rectifying mode can be also used. In addition, in order to further simplify the structure of circuit, the piezo-resistor R1, the filtering capacitors C2, C3, and the inductor L1 in the bridge rectifying filtering unit 131 of the circuit shown in FIG. 9 can be also omitted.

The DC-DC voltage reducing conversion unit 132B is electrically connected to the bridge rectifying filtering unit 131, the feedback unit 133 and LED loads LED1-LEDn (i.e., the plurality of LED units 220 provided on the light source plate shown in FIGS. 4-6), and servers to reduce the pulsating voltage output from the bridge rectifying filtering unit 131 to a required voltage and current level so as to be provided to the LED loads. In addition, the DC-DC voltage reducing conversion unit 132B also cooperates with the feedback unit 133 so as to keep the current and voltage provided to the LED loads constant.

In the LED drive circuit module shown in FIG. 9, the DC-DC voltage reducing conversion unit 132B comprises an inductor L2, a switch diode D1, a capacitor C7, a MOS transistor T and PWM controller U3.

The output end P of the PWM controller U3 is electrically connected to a gate electrode G of the MOS transistor T so as to control on and off the MOS transistor. Examples of the PWM controller include and are not limited to HV9910 type LED driver chip produced by Supertex corporation limited, America, etc.

As shown in FIG. 9, the negative electrode of the switch diode D1 and the positive electrode LED+ of the LED load or the positive electrode output end of the LED drive circuit module are commonly connected to the output end of the bridge rectifying filtering unit 131, and the positive electrode of the switch diode D1 is electrically connected to the drain electrode D of the MOS transistor T. Preferably, a Schottky diode having a fast speed and low voltage reduction can be used as the switch diode D1. The inductor L2 is electrically connected between the negative electrode LED− of the LED load and the drain electrode D of the MOS transistor T. With continued reference to FIG. 9, the PWM controller U3 further comprises a feedback pin FB that is electrically connected with the feedback unit 133. In addition, in the circuit shown in FIG. 9, the capacitor C7 is connected in parallel between the positive electrode LED+ and the negative electrode LED− (i.e., between the positive output end and the negative output end of the LED drive circuit module) so as to smoothen the operational voltage provided to the LED loads. The capacity value of the capacitor C7 can be selected according to the ripple wave value of allowed operational voltage.

With reference to FIG. 9, the PWM controller U3 further comprises a power supply pin VCC and a grounded pin GND, wherein the power supply pin VCC is grounded via the capacitor C4.

The feedback unit 133 comprises a resistor R6. As shown in FIG. 9, the resistor R6 is electrically connected between the source electrode S of the MOS transistor T and the ground. On the other hand, an end of the resistor R6 that is electrically connected to the source electrode S is also electrically connected to the feedback pin FB of the PWM controller U3 so as to provide a feedback signal to the PWM controller U3.

The operational principle of the LED drive circuit module 130 shown in FIG. 9 will be described below.

When the AC power supply is turned on, the bridge rectifying filtering unit 131 converts the input AC into a pulsating voltage and outputs it to the DC-DC voltage reducing conversion unit 132B. Meanwhile, under the control of the PWM controller U3, the MOS transistor T is switched between the above on and off states frequently so that the voltage on the two ends of the LED load is always kept at a certain voltage level.

Specifically, when the MOS transistor T is turned on, the switch diode D1 cuts off. The output current of the bridge rectifying filtering unit 131 flows from the positive electrode LED+ of the LED load and flows to the inductor L2 from the negative electrode LED−. The current flowing through the inductor L2 will increase continuously until the MOS transistor T turns off. With the continuous increase of the current flowing through the inductor L2, more and more energy are stored in the inductor.

Specifically, when the MOS transistor T is switched to an off state, the current flowing through the inductor L2 starts to decrease, thus inducing inductive electromotive force at two ends of the inductor L2, wherein the polarity is positive at the left and negative at the right. The inductive electromotive force is superposed onto the output voltage of the bridge rectifying filtering unit 131 to result in a voltage that is higher than the voltage on the capacitor C7. Therefore, the switch diode D1 turns into an on state, thus providing a free wheeling path for the current flowing through the inductor L2 until the MOS transistor T is switched into the on state once again. In the circuit shown in FIG. 9, a desired voltage reduction range can be obtained by adjusting the duty cycle of the output signal of the PWM controller.

With reference to FIG. 9, the resistor R6 is electrically connected between the source electrode S of the MOS transistor T and the ground. Since the voltage across the resistor R6 corresponds to the current flowing through the MOS transistor T and the inductor L2, this voltage can be applied to the feedback pin FB of the PWM controller U3 as the feedback signal. Specifically, when the MOS transistor T is turned on, the current flowing through the inductor L increases continuously, and when the voltage across the resistor R6 exceeds a predetermined peak current detection threshold value, the PWM controller U3 will be triggered to output a control signal that commands turning off the MOS transistor T, thus enabling a constant current control by controlling the peak current of the MOS transistor T. Obviously, the time it takes to reach the peak current is related to the inductance value of the inductor L2. The larger the inductance value is, the slower the current increases, and the longer it takes to reach the peak current, and vice versa.

It is noted that since the capacitor C7 is connected in parallel between the LED loads, the pulsation of current can be smoothened so that the current flowing through the LED loads is more constant.

Alternatively, the PWM controller U3 and the MOS transistor T can be provided in the LED drive circuit module in the form of being integrated into the same integrated circuit chip. The LED drive circuit module shown in FIG. 10 is an example of such a form, wherein elements identical or similar to those shown in FIG. 9 are denoted by identical reference signs.

Figure 10:
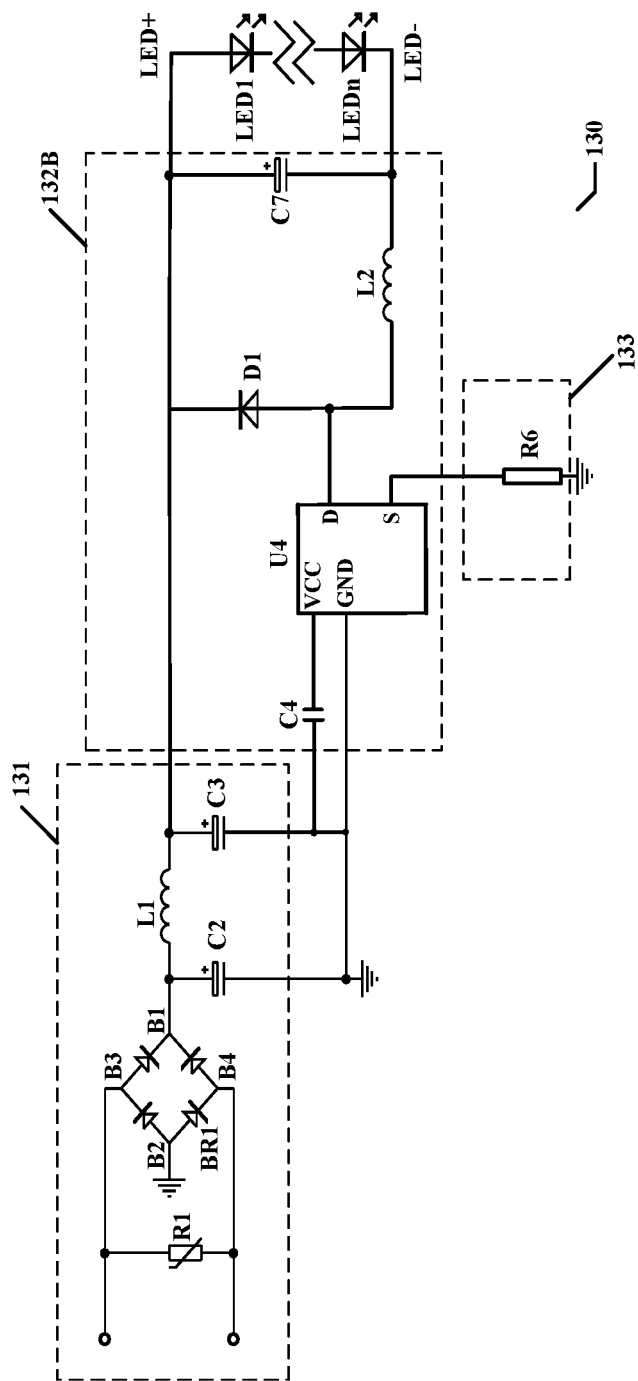
FIG. 10 is a circuit diagram of a variation of a LED drive circuit module shown in FIG. 9.

The LED drive circuit module 130 shown in FIG. 10 also comprises a bridge rectifying filtering unit 131, a DC-DC voltage reducing conversion unit 132B and a feedback unit 133. The forms and structures of the bridge rectifying filtering unit 131 and the feedback unit 133 are the same as those shown in FIG. 9, and a repeated discussion is not given herein.

The DC-DC voltage reducing conversion unit 132B is electrically connected to the bridge rectifying filtering unit 131, the feedback unit 133 and LED loads LED1-LEDn, and servers to reduce the pulsating voltage output from the bridge rectifying filtering unit 131 to a required voltage and current level so as to be provided to the LED loads. In addition, the DC-DC voltage reducing conversion unit 132B also cooperates with the feedback unit 133 so as to keep the current and voltage provided to the LED loads constant.

In the LED drive circuit shown in FIG. 10, the DC-DC voltage reducing conversion unit 132B comprises an inductor L2, a switch diode D1, a capacitor C7 and a switching regulatorU4.

Preferably, an integrated circuit chip integrated with a PWM controller and MOS transistor can be used an the switching regulatorU4, wherein an output end of the PWM controller is electrically connected with a gate electrode of the MOS transistor so as to control on and off of the MOS transistor. Typically, such a switching regulatorchip is generally configured with a drain electrode pin electrically connected with a drain electrode of the MOS transistor, and a source electrode pin electrically connected with a source electrode of the MOS transistor, and preferably, the source electrode pin is electrically connected with a control end of the PWM controller so as to feedback a detection signal corresponding to the current flowing through the MOS transistor to the PWM controller. Examples of the above switching regulatorinclude and are not limited to SSL2108x type LED illumination driver chip produced by NXP Semiconductors Corporation, Netherlands, etc.

As shown in FIG. 10, the negative electrode of the switch diode D1 and the positive electrode LED+ of the LED load are commonly connected to the output end of the bridge rectifying filtering unit 131, and the positive electrode of the switch diode D1 is electrically connected to the drain electrode pin D of the switching regulatorU4. The inductor L2 is electrically connected between the negative electrode LED− of the LED load and the drain electrode pin D of the switching regulatorU4. With continued reference to FIG. 10, the switching regulatorU4 further comprises a source electrode pin S, which is electrically connected to a control end of the PWM controller inside the chip and electrically connected to the feedback unit 433 outside the chip. In addition, in the circuit shown in FIG. 10, the capacitor C7 is connected in parallel between the positive electrode LED+ and the negative electrode LED− so as to smoothen the operational voltage provided to the LED loads.

With reference to FIG. 10, the switching regulatorU4 comprises a power supply pin VCC and a grounded pin GND, wherein the power supply pin VCC is grounded via the capacitor C4.

The feedback unit 133 comprises a resistor R6 electrically connected to the source electrode S of the switching regulatorU4 and the ground. As pointed out when describing the LED drive circuit module shown in FIG. 9, the voltage across the resistor R6 corresponds to the current flowing through the MOS transistor and the inductor L2, and this voltage can be applied to the source electrode S of the switching regulatorU4 as the feedback signal so that a constant current control is realized by the PWM controller inside the switching regulatorU4 controlling the peak current of the MOS transistor. The operational principle of the LED drive circuit shown in FIG. 10 is similar to that shown in FIG. 9, and a repeated discussion is omitted herein.

Alternatively, circuits for enabling other functions can be also integrated into the LED drive circuit module shown in FIGS. 7 to 10, such as a dimming control circuit, a sensing circuit, a smart illumination control circuit, a communication circuit, a protection circuit, etc. These circuits can be integrated into the same semiconductor die or packaged chip with the drive controller, or these circuits can be provided separately in the form of semiconductor dies or packaged chips, or some or all of these circuits can be combined together and provided in the form of semiconductor die or packaged chip.

Figure 11:
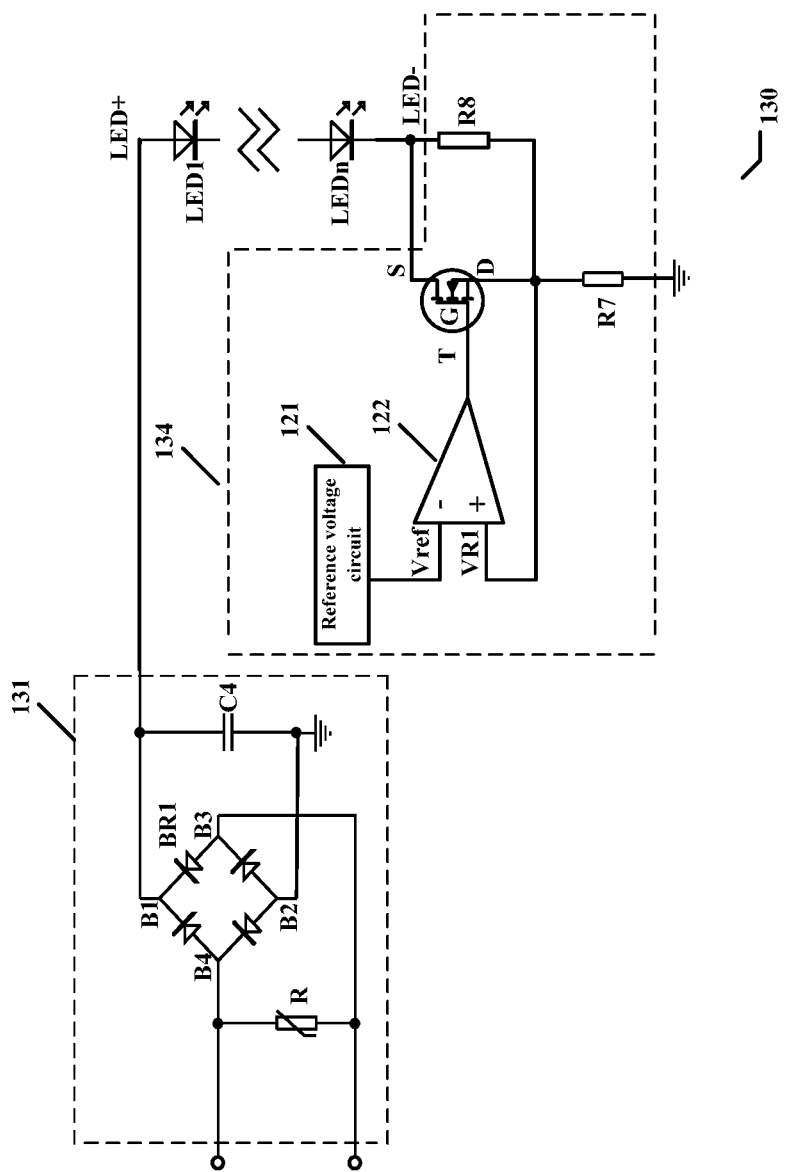
FIG. 11 is a circuit diagram of another LED drive circuit module that can be applied to the embodiment shown in FIGS. 1 to 6.

FIG. 11 is a circuit diagram of another LED drive circuit module that can be applied to the embodiment shown in FIGS. 1 to 6.

The LED drive circuit module 130 shown in FIG. 11 comprises a bridge rectifying filtering unit 131 and a constant current control unit 134, which will be further described below.

As shown in FIG. 11, the bridge rectifying filtering unit 131 comprises a full-bridge rectifier BR1, a capacitor C1 and a piezo-resistor R1. An alternating current (e.g., mains supply) flows through the full-bridge rectifier BR1 so as to be rectified, and a full wave pulsating voltage is output at a positive electrode output end B1 of the bridge rectifying filtering unit or the full-bridge rectifier BR1. The piezo-resistor R1 is connected in parallel between the AC input ends B3 and B4 of the bridge rectifying filtering unit or the full-bridge rectifier BR1, and serves to control an input voltage of the full-bridge rectifier BR1 at a predetermined level by suppressing an abnormal over-voltage occurring in the circuit. The filtering capacitors C1 is electrically connected between the positive electrode output end B1 and the negative electrode output end B2 of the bridge rectifying filtering unit or the full-bridge rectifier BR1 so as to perform low pass filtering on the pulsating voltage output from the full-bridge rectifier BR1. Herein, the negative electrode output end B2 is grounded.

It is worth noting that while a full wave rectifying mode is shown herein, a half wave rectifying mode can be also used. In addition, in order to further simplify the structure of circuit, the piezo-resistor R and the filtering capacitor C1 in the bridge rectifying filtering unit 131 of the circuit shown in FIG. 11 can be also omitted.

The constant current control unit 134 comprises a reference voltage circuit 1341, an amplifier 1342, a MOS transistor T, a first resistor R7 and a second resistor R8. With reference to FIG. 8, LED loads LED1-LEDn (e.g., the plurality of LED units 220 provided on the light source plate 210 shown in FIGS. 4-6) are connected between the bridge rectifying filtering unit 131 and the constant current control unit 134, wherein the positive electrodes LED+ of the LED loads LED1-LEDn are electrically connected to the positive electrode output end B1, and the negative electrodes LED− are electrically connected to the source electrode S of the MOS transistor T, whereas the drain electrode D of the MOS transistor T is grounded via the first resistor R7, thus forming a current circuit. The gate electrode G of the MOS transistor T is electrically connected to an output end of the amplifier 1342, and the drain electrode D, in addition to being electrically connected to the first resistor R7, is also electrically connected to a first input end (e.g., an inverted phase input end-) of the amplifier 1342, thus applying a sampling signal VR1 across the first resistor R7 onto the input end. On the other hand, the reference voltage circuit 1341 is electrically connected to a second input end (e.g., a normal phase input end-) of the amplifier 1342 so as to apply a reference voltage Vref onto the input end. As shown in FIG. 11, a second resistor R8 is also electrically connected between the source electrode S and the drain electrode D of the MOS transistor T.

Preferably, the reference voltage circuit, the amplifier and the MOS transistor can be integrated onto the same one integrated circuit chip. The examples of the above IC chip include but are not limited to IC chip CW11L01, which is available from Shanghai Chipswinner electronics Ltd., China.

In the LED drive circuit module shown in FIG. 11, the MOS transistor T itself has a certain internal resistor, and therefore, the arrangement of the second resistor R8 electrically connected between the source electrode S and the drain electrode D of the MOS transistor T is equivalent to connecting a resistor in parallel with the internal resistor of the MOS transistor T. Therefore, the current flowing through the LED loads LED1-LEDn has not completely flown into the MOS transistor T. Instead, a part of the current is branched into the second resistor R8, thus reducing heat emission volume of the MOS transistor. Alternatively, the operational current of the LED loads can be increased by using a MOS transistor having identical electrical parameters.

The operational principle of the constant current control unit 134 will be described below.

With reference to FIG. 1, a difference between signals applied on two input ends of the amplifier 1342 is amplified and a gate electrode voltage signal is formed on the gate electrode G of the MOS transistor T so as to control on and off of the MOS transistor T, thus making the current flowing through LED loads LED1-LEDn constant. Specifically, when the current flowing through LED loads LED1-LEDn enables a sampling signal VR1 across the first resistor R7 to be larger than the reference voltage Vref, the amplifier 1342 will apply a low electrical level signal on the gate electrode G so as to turn off the MOS transistor T. At this time, the resistance value in the current circuit is large so that the current flowing through LED loads LED1-LEDn is reduced; otherwise, when the current flowing through LED loads LED1-LEDn enables a sampling signal VR1 across the first resistor R7 to be smaller than the reference voltage Vref, the amplifier 1342 will apply a high electrical level signal on the gate electrode G so as to turn on the MOS transistor T. At this time, the resistance value in the current circuit is small so that the current flowing through LED loads LED1-LEDn is increased. The current flowing through LED loads LED1-LEDn is therefore kept substantially constant.

While some aspects of the invention has been illustrated and discussed, those skilled in the art will understand that the above aspects can be modified without departing from the scope and spirit of the invention. Therefore, the scope of invention will be defined by the appended claims and equivalents thereof.

What is claimed is:

1. A drive power supply for a LED incandescent lamp, comprising:
   a pair of end caps having a pair of pins disposed on an outer surface of each of the pair of end caps, each of the pins being hollow and in communication with an interior of the end caps;
   a pair of base plates located in corresponding end caps respectively;
   a pair of lead wires disposed on one of the surfaces of each of the base plates, and each lead wire is inserted into a corresponding pin respectively and is fixed to an inner wall of the pin; and
   a LED drive circuit module located on the base plates and electrically connected to the lead wires.

2. The drive power supply for the LED incandescent lamp according to claim 1, wherein each of the base plates further comprises an insertion needle or an insertion slot, which is disposed on another surface opposite to said one of the surfaces of each of the base plates and is in electrical communication with the LED drive circuit module.

3. The drive power supply for the LED incandescent lamp according to claim 1, wherein the inner wall of each of the pins contract inwardly so as to clamp the lead wire inside it.

4. The drive power supply for the LED incandescent lamp according to claim 1, wherein the LED drive circuit module comprises:
   a bridge rectifying filtering unit;
   a DC-DC voltage boosting conversion unit which comprises an inductor, a switch diode, a PWM controller, and a MOS transistor, wherein the inductor and the switch diode are connected in series between the output end of the bridge rectifying filtering unit and the positive output end of the LED drive circuit module, a drain electrode of the MOS transistor is electrically connected between the inductor and the positive electrode of the switch diode, and a gate electrode of the MOS transistor is electrically connected to the output end of the PWM controller; and
   a feedback unit comprising a crystal triode, a base electrode of the crystal triode being electrically connected to a negative output end of the LED drive circuit module, and a collector electrode of the crystal triode being electrically connected to a control end of the PWM controller.

5. The drive power supply for the LED incandescent lamp according to claim 4, wherein the DC/DC converter further comprises a capacitor electrically coupled between the control end of the PWM controller and the ground.

6. The drive power supply for the LED incandescent lamp according to claim 1, wherein the LED drive circuit module comprises:
   a bridge rectifying filtering unit;
   a DC-DC voltage reducing conversion unit which comprises an inductor, a switch diode, a PWM controller, and a MOS transistor, wherein a negative electrode of the switch diode and a positive output end of the LED drive circuit module are commonly connected to an output end of the bridge rectifying filtering unit, a drain electrode of the MOS transistor is electrically connected to the positive electrode of the switch diode, a gate electrode of the MOS transistor is electrically connected to the output end of the PWM controller, and the inductor is electrically connected between the drain electrode of the MOS transistor and the negative output end of the LED drive circuit module; and
   a feedback unit comprising a resistor, the resistor and a control end of the PWM controller being commonly connected to a source electrode of the MOS transistor.

7. The drive power supply for the LED incandescent lamp according to claim 1, wherein the LED drive circuit module comprises a bridge rectifying filtering unit and a constant current control unit, wherein the constant current control unit comprises an amplifier, a MOS transistor and a first resistor, the positive output end of the bridge rectifying filtering unit is connected to a positive output end of the LED drive circuit module, a source electrode of the MOS transistor is electrically connected to the negative output end of the LED drive circuit module, a drain electrode of the MOS transistor is electrically connected to a first input end of the amplifier and is connected to the ground via the first resistor, and the output end of the amplifier is electrically connected to a gate electrode of the MOS transistor so as to control on and off of the MOS transistor according to a result of comparison between the voltage on the drain electrode and a reference voltage on a second input end of the amplifier.

8. The drive power supply for the LED incandescent lamp according to claim 7, wherein the constant current control unit further comprises a second resistor electrically connected between the source electrode and the drain electrode of the MOS transistor.

9. A LED incandescent lamp, comprising:
   a tube body;
   a light source plate located inside the tube body and having a plurality of LED units arranged thereon;
   a pair of end caps enclosing both ends of the tube body, a pair of pins being disposed on an outer surface of each end cap, the pair of pins being hollow and in communication with an interior of the end cap;
   a pair of base plates located in corresponding end caps respectively fixed together with the light source plate, a pair of lead wires are disposed on one of the surfaces of each base plate, and each lead wire is inserted into the pin of a corresponding end cap respectively and is fixed to an inner wall of the pin; and
   a LED drive circuit module located on the pair of base plates and electrically connected to the lead wires of one of the base plates.

* * * * *